United States Patent [19]

Kita et al.

[11] Patent Number: 5,356,736
[45] Date of Patent: Oct. 18, 1994

[54] ORGANIC ELECTROLYTE SOLUTION TYPE CELL

[75] Inventors: Fusaji Kita; Akira Kawakami, both of Osaka; Kozo Kajita, Shiga, all of Japan

[73] Assignee: Hitachi Maxell, Ltd., Osaka, Japan

[21] Appl. No.: 987,251

[22] Filed: Dec. 7, 1992

Related U.S. Application Data

[60] Continuation of Ser. No. 738,607, Jul. 31, 1991, abandoned, which is a division of Ser. No. 499,667, Mar. 27, 1990, Pat. No. 5,085,594.

[30] Foreign Application Priority Data

Mar. 31, 1989 [JP] Japan ................................. 1-81681

[51] Int. Cl.$^5$ .......................................... H01M 10/40
[52] U.S. Cl. .................................... 429/197; 429/198
[58] Field of Search ............................ 429/197, 198

[56] References Cited

U.S. PATENT DOCUMENTS

| | | | |
|---|---|---|---|
| 4,252,876 | 2/1981 | Koch | 429/197 |
| 4,751,160 | 6/1988 | Plichta et al. | 429/197 |
| 4,786,499 | 11/1988 | Slane et al. | 429/197 |
| 4,833,048 | 5/1989 | DeJonghe et al. | 429/104 |
| 4,880,714 | 11/1989 | Bowden | 429/198 X |

FOREIGN PATENT DOCUMENTS

| | | | |
|---|---|---|---|
| 2124388 | 9/1972 | European Pat. Off. | |
| 52-23623 | 2/1977 | Japan | 429/198 |
| 57-80667 | 5/1982 | Japan | 429/197 |
| 58-68878 | 4/1983 | Japan | 429/198 |
| 58-106771 | 6/1983 | Japan | |
| 59-08276 | 6/1984 | Japan | 429/198 |
| 59-108276 | 6/1984 | Japan | |
| 59-108277 | 6/1984 | Japan | |
| 61-214377 | 9/1986 | Japan | |
| 62-080977 | 4/1987 | Japan | |
| 62-090869 | 4/1987 | Japan | |
| 62-217578 | 9/1987 | Japan | |

OTHER PUBLICATIONS

Patent Abstracts of Japan, vol. 7, No. 214 (E-199), 12 Sep. 1983; and JP-A-58 105 771 (Nippon Denshin Denwa Kosha) Jun. 25, 1983, Abstract only.

Patent Abstracts of Japan, vol. 10, No. 164-(E-410), 11th Jun. 1986; and JP-A-61 16 477 (Sanyo) Jan. 24, 1986, Abstract only.

Patent Abstracts of Japan, vol. 12, No. 77 (E-589), 10th Mar. 1988; and JP-A-62 217 578 (Hitachi Maxell) Sep. 25, 1987, Abstract only.

Patent Abstracts of Japan, vol. 13, No. 344 (E-797), 3rd Aug. 1989; and JP-A-1 102 862 (Matsushita) Apr. 20, 1989, Abstract only.

Primary Examiner—Stephen Kalafut
Attorney, Agent, or Firm—Birch, Stewart, Kolasch & Birch

[57] ABSTRACT

An organic electrolytic solution type cell using an electrolytic solution of a lithium salt in a polar solvent which comprises a compound having an organophobic group and an organophilic group, which cell has improved storage stability and good charge-discharge characteristics.

14 Claims, 3 Drawing Sheets

PC: Propylene carbonate
THF: Tetrahydrofuran
DME: 1,2-Dimethoxyethane

PC: Propylene carbonate
THF: Tetrahydrofuran
DME: 1,2-Dimethoxyethane

ORGANIC ELECTROLYTE SOLUTION TYPE CELL

This application is a continuation of Ser. No. 738,607 filed on Jul. 31, 1991, now abandoned, which is a divisional of Ser. No. 499,667 filed on Mar. 27, 1990, now U.S. Pat. No. 5,085,594, the entire contents of which is incorporated by reference.

BACKGROUND OF THE INVENTION

1. Field of the Invention

The present invention relates to an organic electrolytic solution type cell comprising a non-aqueous electrolytic solution such as a lithium cell.

2. Description of the Related Art

As the non-aqueous electrolytic solution for an organic electrolytic solution type cell, a solution of a lithium salt in a polar solvent is used. Examples of the lithium salt are $LiClO_4$, $LiAsF_6$ and $LiPF_6$, and examples of the polar solvent are propylene carbonate, $\gamma$-butyrolactone, dimethoxyethane and dioxolane.

In the cell comprising the non-aqueous electrolytic solution, a negative electrode Li reacts with a harmful material such as water, oxygen gas, nitrogen gas and impurities which are contained in the electrolytic solution or, in some case, components of the electrolytic solution, so that the surface of the lithium electrode is deactivated. Thus, cell performance, such as closed circuit voltage, are deteriorates during storage.

When the organic electrolytic solution type cell is used as a secondary cell, the reaction between the harmful materials in the electrolytic solution and the lithium electrode deteriorates the charge-discharge cycle characteristics.

$LiPF_6$ is practically preferable as an electrolyte since it is safe, unlike $LiClO_4$, or it is a toxic, unlike $LiAsF_6$. However, it is thermally unstable and decomposes during storage at a high temperature. Therefore, the cell performance is further deteriorated.

To improve the thermal stability of $LiPF_6$, it is proposed to add hexamethylphosphoric triamide (hereinafter referred to as "HMPA") or tetramethylethylenediamine (hereinafter referred to as "TMEDA"). Since such additives do not achieve sufficient effects and HMPA may react with active lithium metal of the negative electrode, improvement of the storage stability cannot be expected.

SUMMARY OF THE INVENTION

One object of the present invention is to provide an organic electrolytic solution type cell having improved storage stability and charge-discharge cycle characteristics.

Another object of the present invention is to provide an organic electrolytic solution type cell having thermal stability even when $LiPF_6$ is used as the electrolyte.

These and other objects of the present invention are achieved by an organic electrolytic solution type cell using an electrolytic solution of a lithium salt in a polar solvent which comprises a compound having an organophobic group and an organophilic group.

With the compound of the polar solvent having the organophobic group and the organophilic group, the surface of the lithium electrode may be protected so that the reaction of lithium metal with the electrolytic solution, impurities or water may be prevented.

In a preferred embodiment of the present invention, a trialkylamine of the formula:

$$R_1-\underset{\underset{R_2}{|}}{N}-R_3 \qquad (I)$$

wherein $R_1$, $R_2$ and $R_3$ are the same or different and each is an alkyl group having at least 3 carbon atoms at least one of hydrogen atoms of which may be substituted with a fluorine atom is used in combination with $LiPF_6$ as the electrolyte. In such a combination, the trialkylamine (I) not only protects the lithium electrode, but also stabilizes the $LiPF_6$ so that the cell has good storage stability. In addition, when the trialkylamine (I) is used together with other stabilizers for $LiPF_6$, the storage stability of the cell can be further improved.

DETAILED DESCRIPTION OF THE INVENTION

Figure 1:
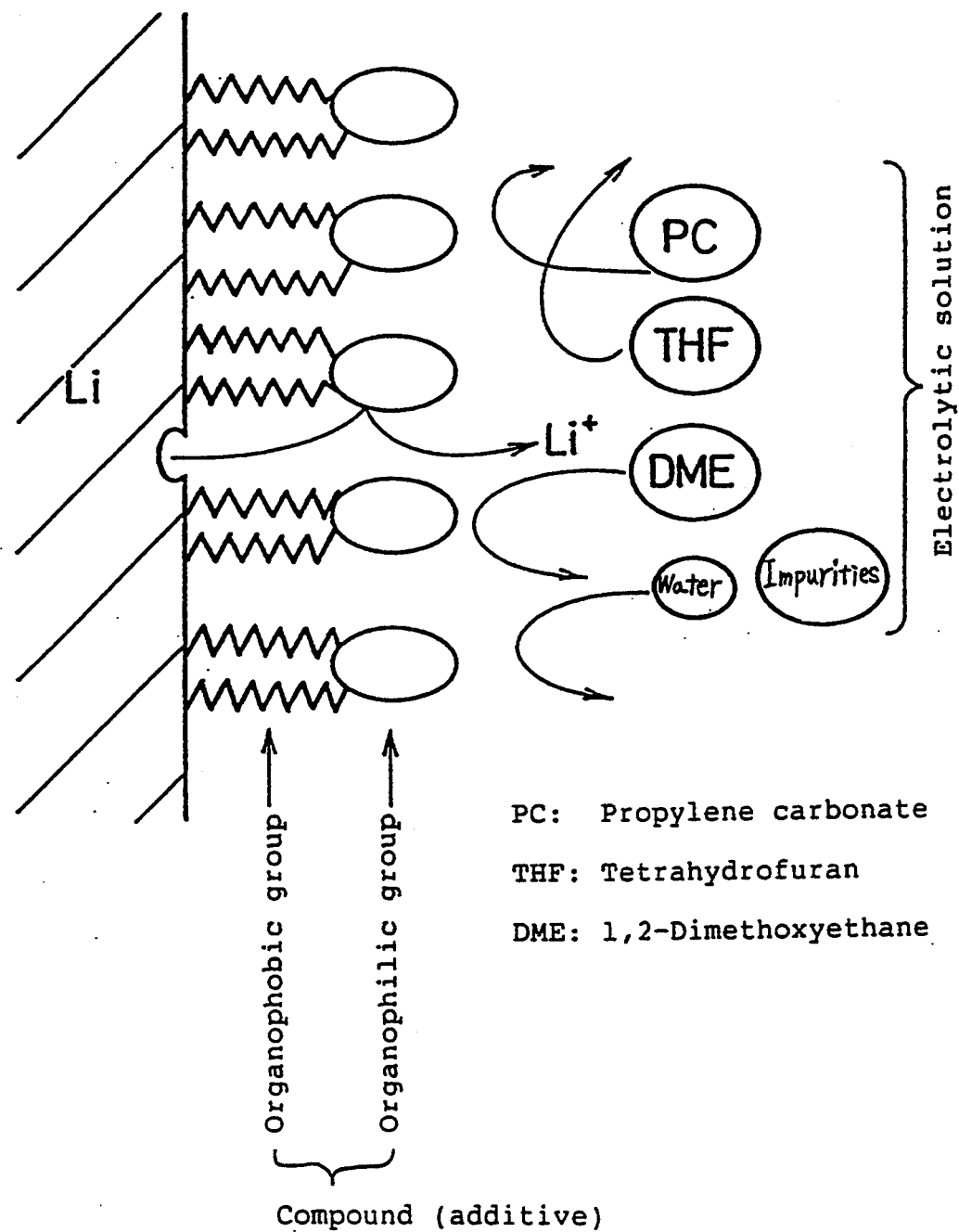
FIG. 1 schematically shows the function of the compound having the organophobic group and the organophilic group in the organic electrolytic solution type cell.

FIG. 1 shows a model of the function of the compound having the organophobic group and the organophilic group in the organic electrolytic solution type cell. Since the organophobic group of the compound is very slightly soluble in the electrolytic solution, it faces the lithium electrode surface, while the organophilic group of the compound, which is soluble in the electrolytic solution, faces the electrolytic solution. Due to such properties of the organophobic and organophilic groups of the compound, the molecules of the compound are arranged and orientated as shown in FIG. 1. As a result, the reaction between the lithium electrode surface and the harmful materials is prevented.

The molecules of the compound do not greatly suppress liberation of the lithium ions ($Li^+$) during discharge of the cell, since the molecules are present on the lithium electrode surface in the form of a single molecule layer and the lithium ions can be liberated into the electrolytic solution via the organophilic groups.

In the present specification, the organophobic group is intended to mean a part of an organic molecule, which part has low solubility in the polar solvent.

The organophobic group of the compound is preferably an alkyl group at least one hydrogen atom of which may be substituted with a fluorine atom. Preferably, the alkyl group is a straight chain or linear one. To impart organophobicity to the group, the alkyl group has at least 3 carbon atoms, preferably at least 4 carbon atoms. Preferably, the number of the carbon atoms in the alkyl group does not exceed 10.

The organophilic group is intended to comprise a part of an organic molecule, which part has a high solubility in the polar solvent. Preferred examples of the organophilic group are an amino group, a ketone group, an ether group and an ester group. The amino group has large affinity with the lithium ions and large solubility in the solvent. The ketone group and the ester group have relatively large organophilicity and less reactivity with the lithium metal. The ether group has adequate organophilicity and is most stable against the lithium metal. Usually, one organophilic group is bonded with at least two organophobic groups. The combination of the organophobic group and the organophilic group and the amount of the compound to be added to the electrolytic solution are determined according to the functions of these groups.

The present invention is now explained in detail by using the trialkylamine as an example of the compound having the organophobic group and the organophilic group.

The trialkylamine is represented by the formula (I). The number of the carbon atoms in $R_1$, $R_2$ or $R_3$ is at least 3, preferably at least 4. Examples of the trialkylamine are tributylamine, trihexylamine and tridecylamine.

The content of the trialkylamine in the electrolytic solution is generally from 0.05 to 5% by volume, and preferably from 0.1 to 1.5% by volume. When the content of the alkylamine is too small, the intended effects are not achieved. When the content is too large, the cell performance such as the closed circuit voltage (CCV) of the cell during discharge is decreased.

The trialkylamine not only protects the lithium electrode surface but also stabilizes $LiPF_6$. Therefore, the trialkylamine is preferably used when the electrolytic solution contains $LiPF_6$.

Together with the trialkylamine, other stabilizers for $LiPF_6$ may be used. In this case, the lithium electrode surface is protected and the stabilizing effect of the trialkylamine is strengthened.

Examples of the other stabilizers are a compound having a bond of the formula: >N—P(=O) (e.g. HMPA), tetraalkyldiamines (e.g. TMEDA) and pyridines. Preferably, an N-dialkylamide of the formula:

(II)

wherein $R_4$ or $R_5$ are the same and different and each being a saturated hydrocarbon group having from 1 to 10 carbon atoms, preferably 1 to 3 carbon atoms, and optionally an oxygen atom or a nitrogen atom in a carbon chain, and $R_6$ is a hydrogen atom or the same hydrocarbon group as above, provided that two of the $R_4$, $R_5$ and $R_6$ may together form a ring.

The N-dialkylamide (II) strongly stabilizes $LiPF_6$ and hardly reacts with the lithium negative electrode.

Specific examples of the N-dialkylamide (II) are 1-methyl-2-piperidone, 1-methyl-2-pyrrolidinone, 1-ethyl-2-pyrrolidinone, N,N-dimethylacetamide, N,N-diethylacetamide, N,N-dimethylformamide, N,N-dimethylpropionamide, 1,5-dimethyl-2-pyrrolidinone, 1,3-dimethyl-3,4,5,6-tetrahydro-2(1H)-pyrimidinone, 4-formylmorpholine, 1-formylpiperidine, 1-(3-methylbutyryl)pyrrolidine, N-methylcaprolactam, bispentamethyleneurea, 1-cyclohexyl-2-pyrrolidinone, N,N-dimethyldodecaneamide, N,N-diethylformamide, N,N-diethylpropioneamide, 1,3-dimethyl-2-imidazolidinone and the like.

The amount of the stabilizer for $LiPF_6$ in the electrolytic solution may be from 0.1 to 5% by volume, preferably from 0.2 to 1.5% by volume, and a total amount of the trialkylamine (I) and the stabilizer is generally from 0.1 to 10% by volume, preferably from 0.2 to 5% by volume.

Examples of the polar solvent are propylene carbonate, γ-butyrolactone, dimethylsulfoxide, ethylene carbonate, 1,2-dimethoxyethane, tetrahydrofuran, 1,3-dioxolane, 4-methyl-1,3-dioxolane, 2-methyltetrahydrofuran, other aliphatic monoethers and polyethers and the like.

Examples of the electrolyte are $LiPF_6$, $LiClO_4$, $LiCF_3SO_3$, $LiBF_4$, $LiCF_3CO_2$, $LiAsF_6$, $LiB(C_6H_5)_4$, $LiSbF_6$ and the like. They may be used independently or as a mixture of two or more of them.

The amount of the electrolyte is selected from the range of 0.2 to 1.5 mole/liter so that conductivity of the electrolytic solution is at least 3 ms/cm at 25° C. according to the kind of electrolyte.

The organic electrolytic solution type cell of the present invention uses the non-aqueous electrolytic solution of the electrolyte in the polar solvent to which the compound having the organophobic group and the organophilic group, such as the trialkylamine (I), is added, and includes various primary and secondary cells.

Examples of active materials for the positive electrode are metal oxides such as $MnO_2$, $V_2O_5$, $MoO_3$, $Pb_3O_4$, $Bi_3O_4$, $Co_3O_4$, $TiO_2$, $Cr_3O_8$, $Cr_2O_5$ and $LiCoO_2$, mixed oxides thereof, metal sulfides, such as $TiS_2$, $CuS$ and $FeS$, and mixtures thereof. Among them, $MnO_2$ is preferred since it has a high single-electrode potential and generates a high voltage of about 3 V in the cell comprising lithium as the negative electrode. In addition, complex $MnO_2$ or modified $MnO_2$, which have been recently developed can achieve good charge-discharge cycle characteristics.

Examples of active materials for the negative electrode are light metals such as lithium, potassium, sodium, calcium and magnesium and lithium alloys such as LiAl, LiIn, LiCd, LiSi, LiGa, etc. Among them, lithium metal is preferred.

Figure 2:
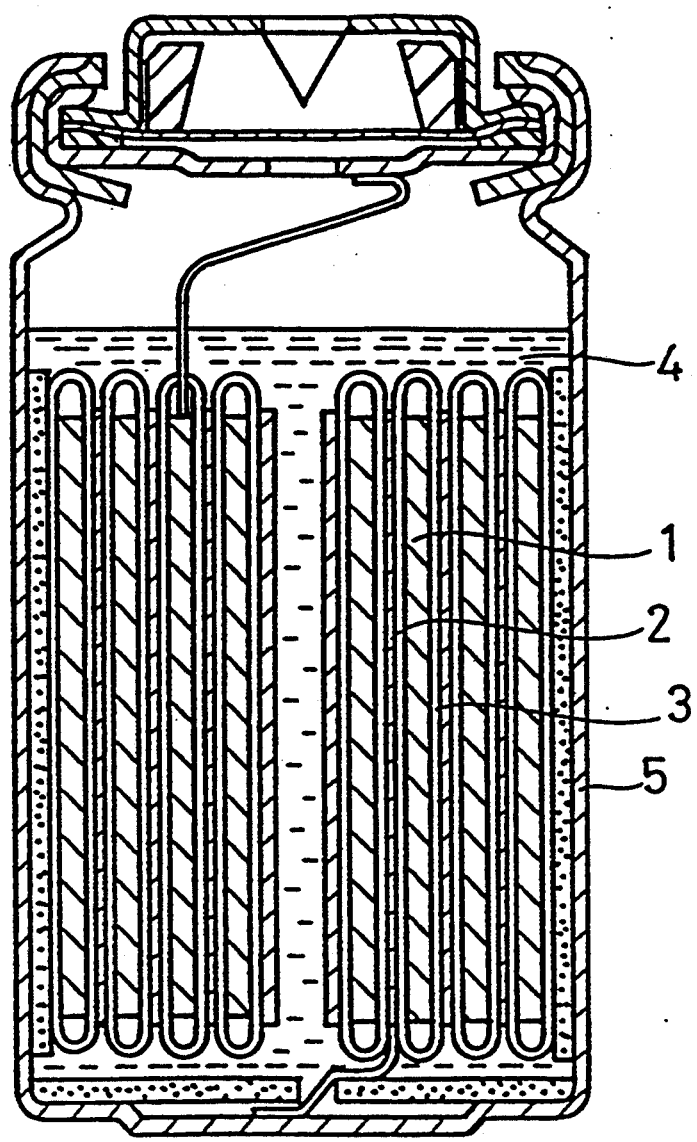
FIG. 2 is a cross sectional view of one embodiment of the organic electrolytic solution type cell of the present invention.

FIG. 2 shows a cross sectional view of a spiral wound cell according to the present invention. The cell comprises a positive electrode 1, a negative electrode 2, a bag shape separator 3, which wraps the positive electrode 1, and a non-aqueous electrolytic solution 4. The electrodes 1 and 2 are laminated and spirally wound and then installed in a cylindrical stainless steel cell case which acts as the negative electrode can. The whole electrodes are immersed in the electrolytic solution 4.

In addition to the spiral wound cell of FIG. 2, the cell may be in any form such as a can-type cell, a button shape cell, a coin shape cell or other thin cells.

PREFERRED EMBODIMENTS OF THE INVENTION

The present invention will be illustrated by the following Examples.

EXAMPLE 1

A band shape lithium negative electrode having a thickness of 0.17 mm and a width of 30 mm and a band shape $MnO_2$ positive electrode having a thickness of 0.4 mm and a width of 30 mm which was wrapped in a bag shape separator made of microporous polypropylene were laminated and wound. To each electrode, a lead member was attached. Then, the wound electrodes were installed in a stainless steel cell case having an outer diameter of 15mm.

Separately, an electrolytic solution was prepared by dissolving 0.5 mole/liter of $LiClO_4$ and 0.1 mole/liter of $LiPF_6$ in a mixed solvent of propylene carbonate, tetrahydrofuran and 1,2-dimethoxyethane in a volume ratio of 1:1:1, removing water from the solution and then adding 0.5% by volume of tributylamine. The solution contained less than 50 ppm of water.

The electrolytic solution was poured in the cell case which contained the electrodes.

The opening of the cell case was closed, and the cell was stabilized and aged to obtain a cylindrical spiral wound cell having an outer diameter of 15 mm, a height of 40 mm and a structure shown in FIG. 2.

EXAMPLE 2

In the same manner as in Example 1 but using 0.5% by volume of N,N-dimethylacetamide in addition to tributylamine, the cell was produced.

COMPARATIVE EXAMPLE 1

In the same manner as in Example 1 but using no tributylamine, the cell was produced.

COMPARATIVE EXAMPLE 2

In the same manner as in Example 1 but using 5% by volume of N,N-dimethylacetamide in place of tributylamine, the cell was produced.

Figure 3:
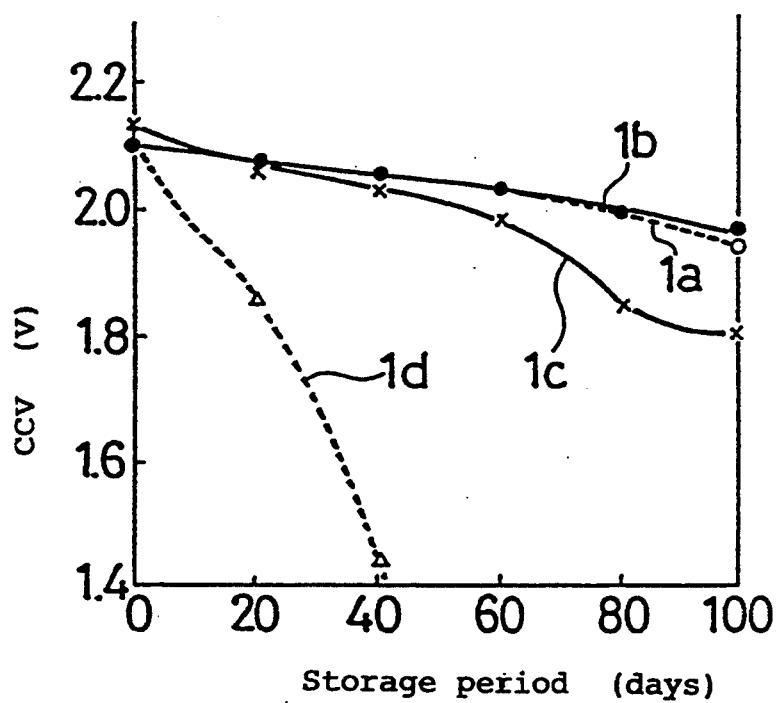
FIG. 3 is a graph showing the results of stability tests of the cells in the Examples and the Comparative Examples.

Each of the cells produced in Examples 1 and 2 and Comparative Examples 1 and 2 was stored at 60° C. for 100 days. Every 20 days, the closed circuit voltage after 0.5 second at 3 A was measured. The results are shown in FIG. 3, in which the curves 1a, 1b, 1c and 1d represent the results for the cells produced in Examples 1 and 2 and Comparative Examples 1 and 2, respectively.

As is clear from these results, the addition of tributylamine or a combination of tributylamine and N,N-dimethylacetamide to the electrolytic solution greatly improved the storage stability of the cells.

With the non-aqueous electrolytic solutions prepared in Examples 1 and 2 and Comparative Examples 1 and 2, stabilizing tests were carried out as follows:

Ten milliliters of the non-aqueous electrolytic solution was charged in a 10 ml vial. In the vial, a lithium metal piece of 1 cm × 4 cm was added. The opening of the vial was closed with a polyethylene stopper and sealed with an aluminum cap. Then, the vial was stored at 80° C. for 10 days and opened. The surface condition of the lithium piece and color of the electrolytic solution were observed. The results are shown in Table 1.

TABLE 1

| Example No. | Condition of Li piece surface | Color of electrolytic solution |
|---|---|---|
| 1 | Gloss | Slightly colored |
| 2 | Gloss | Transparent |
| Comp. 1 | Black colored over whole surfaces | Brown |
| Comp. 2 | Slightly colored over whole surfaces | Substantially transparent |

As understood from the results of Table 1, the non-aqueous solution of the present invention can protect the surfaces of the lithium piece and stabilize $LiPF_6$.

EXAMPLES 3 to 6

In the same manner as in Example 1, but using an additive listed in Table 2, the cell was produced.

The cell had the same storage stability as those produced in Examples 1 and 2.

The stabilizing test was carried out in the same manner as in Example 1. The results are shown in Table 2.

TABLE 2

| Example No. | Additive[1] (vol. %) | Condition of Li piece surface | Color of electrolytic solution |
|---|---|---|---|
| 3 | THA (1) | Gloss | Slightly colored |
| 4 | TDA (1) | Gloss | Slightly colored |
| 5 | THA (0.5) HMPA (1) | Gloss | Substantially transparent |
| 6 | TBA (0.5) DEAD (1) | Gloss | Transparent |

Note:
[1]THA: Trihexylamine. TDA: Tridecylamine. TBA: Tributylamine. DEAD: N,N-Diethylacetamide.

EXAMPLES 7 TO 12 AND COMPARATIVE EXAMPLES 3 AND 4

In the same manner as in Example 1 but using an electrolyte and an additive listed in Table 3, the cell was produced.

The cells produced in the Examples had better storage stability than those produced in the Comparative Examples.

The stabilizing test was carried out in the same manner as in Example 1. The results are shown in Table 3.

What is claimed is:

1. An organic electrolytic solution cell comprising a positive electrode, a negative electrode which comprises lithium and an electrolytic solution of a lithium salt in a polar solvent which contains a compound comprising an organophobic group having at least one straight chain alkyl group with at least three carbon atoms and an organophilic group selected from the group consisting of a ketone group, an ether group and an ester group, said organophobic and organophilic group being directly connected.

2. The organic electrolytic solution cell according to claim 1, wherein at least one hydrogen atom of said alkyl organophobic group may be substituted by a fluorine atom.

3. The organic electrolytic solution cell according to claim 1, wherein said alkyl group has at least 4 carbon atoms.

4. The organic electrolytic solution cell according to claim 1, wherein said organophilic group is a ketone group.

5. The organic electrolytic solution cell according to claim 1, wherein said organophilic group is an ether group.

6. The organic electrolytic solution cell according to claim 1, wherein said organophilic group is an ester group.

7. The organic electrolytic solution cell according to claim 1, wherein said compound comprises one organophilic group bonded with at least two organophobic groups.

8. The organic electrolytic solution cell according to claim 1, wherein said electrolytic solution contains 0.05 to 5% by volume of said compound.

9. The organic electrolytic solution cell according to claim 8, wherein said electrolytic solution contains 0.1 to 1.5% by volume of said compound.

10. The organic electrolytic solution cell according to claim 1, wherein said polar solvent includes propylene carbonate.

11. The organic electrolytic solution cell according to claim 1, wherein said lithium salt contains $LiPF_6$.

12. The organic electrolytic solution cell according to claim 11, wherein said electrolytic solution further contains a stabilizer for said $LiPF_6$.

13. The organic electrolytic solution cell according to claim 12, wherein said stabilizer is at least one member selected from the group consisting of N,N-dimethylacetamide, N,N-diethylacetamide and 1-methylpiperidone.

14. The organic electrolytic solution cell of claim 11, wherein said lithium salt further includes $LiClO_4$.

* * * * *